Nov. 23, 1971 P. J. PRINTZ 3,621,817
ANIMAL DUMPING LITTER BOX
Filed March 23, 1970 5 Sheets-Sheet 1

INVENTOR
PHILIP J. PRINTZ
BY Synnestvedt & Lechner
ATTORNEY

INVENTOR
PHILIP J. PRINTZ
BY Synnestvedt & Lechner
ATTORNEY

INVENTOR
PHILIP J. PRINTZ
BY Synnestvedt & Lechner
ATTORNEY

Nov. 23, 1971 P. J. PRINTZ 3,621,817
ANIMAL DUMPING LITTER BOX
Filed March 23, 1970 5 Sheets-Sheet 5

INVENTOR
PHILIP J. PRINTZ
BY Synnestvedt & Lechner
ATTORNEY

United States Patent Office 3,621,817
Patented Nov. 23, 1971

3,621,817
ANIMAL DUMPING LITTER BOX
Philip J. Printz, 221 Oak Terrace,
Mount Penn, Pa. 19606
Filed Mar. 23, 1970, Ser. No. 21,839
Int. Cl. A01k 15/00, 29/00
U.S. Cl. 119—1                                4 Claims

ABSTRACT OF THE DISCLOSURE

Apparatus for supporting an animal, receiving its body waste and dispersing its body waste in litter comprising a base having a superimposed, vertically depressible apertured platform for the animal, a bowl containing litter and positioned beneath the apertured platform so as to receive the body waste, and means attached to the base and engaging the platform and actuated by the weight of the animal for tilting and rotating the bowl, thereby dispersing the body waste in the litter.

BACKGROUND OF THE INVENTION

(1) Field of the invention

This invention relates generally to devices for keeping household pets and their surroundings in a clean, sanitary condition. Specifically, it relates to devices for enabling household animals, especially cats, to eliminate body wastes in a clean, sanitary way without allowing such waste to come in contact with the body of the animal, there to be carried to nearby furniture or to occupants of the household.

(2) Description of the prior art

The most common indoor household device used for receiving the body waste of an animal is a box that contains sand or litter and simulates, to a degree, a natural outdoor environment. Animals, especially cats, find themselves naturally attracted to it. After making use of such a box, an animal, by its natural instincts, usually attempts to cover the excreted body waste by pawing dirt over it. This presents a sanitary problem because the body waste may come in contact with the paws or other parts of the animal and can be carried away to later soil rugs, furniture and people who hold the animal. In addition, the area immediately surrounding the box usually becomes strewn with material pawed out of the box by the animal.

Another disadvantage of the common sand or litter box is that, after using it, the animal may not cover the body waste with sand or litter, thus permitting an unnecessary amount of disagreeable odor to be emitted. Since the animal waste is randomly deposited in the box, the utilization of the sand or litter is not efficient and the owner of the pet will usually overcome this problem by replacing the sand or litter in the box more often than necessary and while much of it is still clean and absorptive.

SUMMARY OF THE INVENTION

Accordingly, it is an object of this invention to provide an improved receptacle for receiving body eliminations from household pets.

Another object of this invention is to provide a receptacle for receiving the elimination of household pets that prevents the pet from pawing in the elimination or the sand or litter in which it is deposited.

Another object of this invention is to provide methods and means whereby the body elimination from household pets may automatically be distributed throughout sand or litter contained within a receptacle.

Another object of this invention is to provide a pet litter box which may be left unattended for relatively long periods of time, that will automatically disperse newly received body waste in the litter, and will automatically discharge contaminated litter to a suitable receptacle for disposal.

Another object of this invention is to increase the efficiency of utilization of litter contained within a pet litter box and to minimize the permeation of disagreeable odors therefrom.

Figure 1:
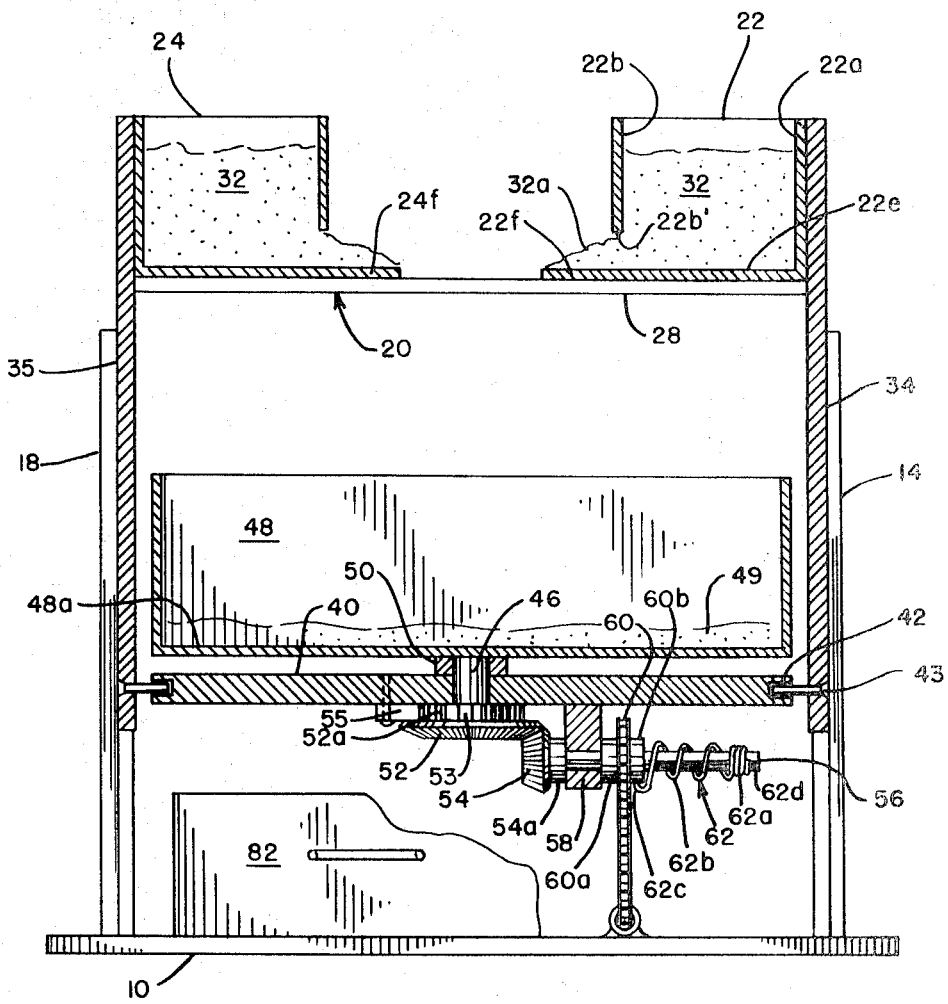
FIG. 1 is a front elevation in partial section of the apparatus of this invention.
Figure 2:
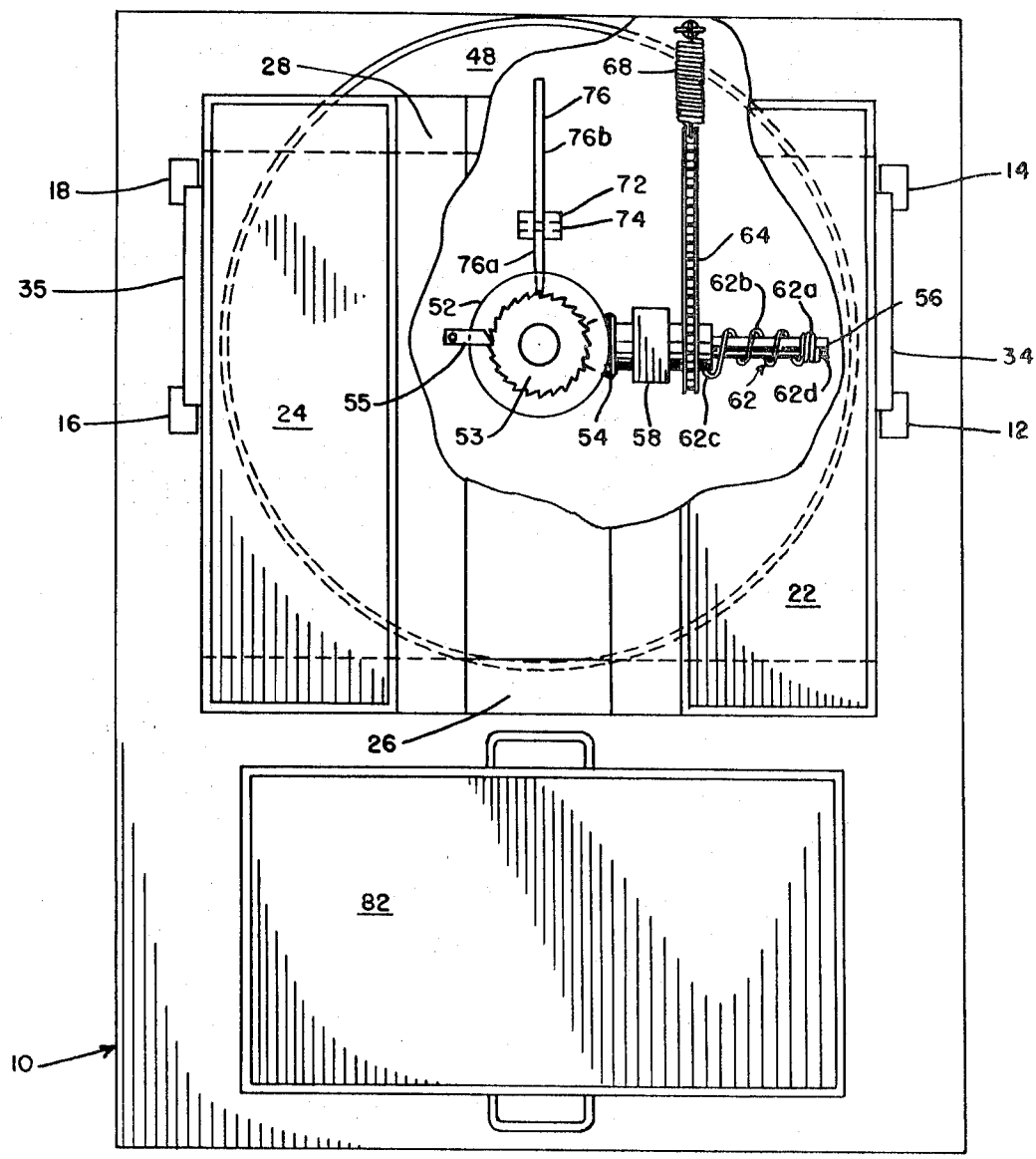
FIG. 2 is a plan view, partially in section, of the apparatus of FIG. 1.

Referring to the drawings, a flat base 10 supports right side uprights 12 and 14 and left side uprights 16 and 18. Disposed above the base 10 ise a platform 20 supported in a manner to be described. Platform 20 comprises two similar trays 22 and 24 joined by cross pieces 26 and 28. Tray 22 comprises outside side wall 22a, inside side wall 22b, front end wall 22c, rear end wall 22d, and a bottom 22e, which extends inward to form a ledge 22f. The lower edge 22b' of the inside wall 22b is spaced from the tray bottom 22e, thus forming a long slot. Thus, litter designated 32 contained in the tray 22 may flow through the slot and spill onto ledge 22f, the spilled litter being marked 32a. Tray 24 is similarly constructed and has a ledge 24f. The platform 20 is adapted to support an animal which may straddle the longitudinal aperture between the trays by placing its feet on ledges 22f and 24f.

On the right side, the outside side wall 22a of tray 22 is fixed to a bar 34 slidably received in right side uprights 12 and 14. Similarly, bar 35 on the other side is slidably received in uprights 16 and 18. Thus, the platform 20 is adapted for vertical movement toward or away from base 10. If desired, tray support bars 34 and 35 may be further secured by means of a tie rod 42.

Figure 3:
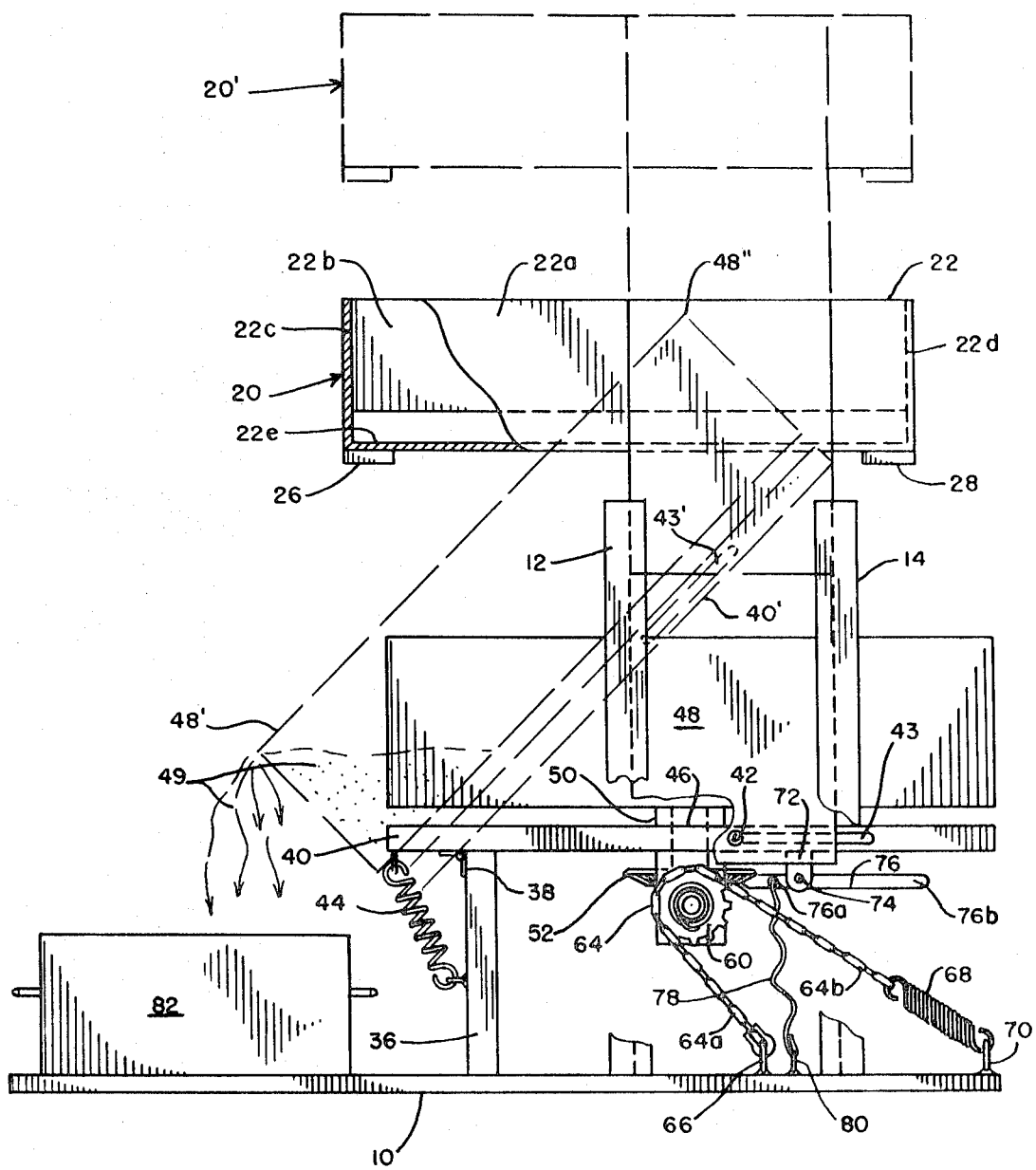
FIG. 3 is a right side elevation of the apparatus of FIG. 1.

Fixed on base 10 is a block 36 carrying hinges 38 which are attached to the bottom of a plate 40 so that, in the configuration shown in FIG. 3, plate 40 may be rotated from its horizontal position as shown to an alternative position 40' illustrated in dashed lines.

As illustrated in FIG. 3, the left bottom portion of plate 40 is secured to one end of a tension spring 44. The other end of the spring 44 is attached to the bottom portion of block 36.

A shaft 46 passes through and is journaled for rotation in plate 40. The upper end of shaft 46 is fixedly attached to a bowl 48 adapted to hold litter 49. The bowl bottom 48a is spaced from plate 40 by a washer 50. When the apparatus is not in use, spring 44 will hold plate 40 and bowl 48 tilted at an angle to the horizontal as shown in dashed lines. This angle should exceed the angle of repose of sand or litter material which normally will be an angle of about 40° to 45° or more.

Fixed on the lower end of shaft 46 is a bevel gear 52 spaced from plate 40 by its hub 52a and meshing with a bevel gear 54. As shown in FIG. 1, gear 54 is fixed on the left end of a shaft 56 which is journaled for rotation in bearing block 58. Gear 54 is spaced from block 58 by its hub 54a and block 58 is supported on the lower surface of plate 40.

Attached for rotation with shaft 46 is a ratchet wheel 53. This wheel, in cooperation with pawl 55, allows shaft 46 and bowl 48 to rotate in only one direction.

Shaft 56, as shown in FIG. 1, extends through and is free to turn in bearing block 58. A sprocket wheel 60 is rotatably mounted on the shaft 56 and carries hubs 60a and 60b. Fixedly attached to hub portion 60b of sprocket wheel 60 is a spring 62 of special design. The spring has a small diameter clutch section 62a tightly coiled around the end portion of shaft 56 and a large diameter energy-storage section 62b. The end 62c of the energy-storage section of the spring 62 is bent inwardly and enters a hole in sprocket hub 60b. The end 62d of the spring forms the termination of the outside coil of the clutch section 62a and is unattached except by frictional contact with the shaft 56. This cooperative arrangement of the sprocket 60, spring 62 and shaft 56 form a simple one-way clutch as is well known.

Most clearly shown in FIG. 3 is a chain 64 that engages sprocket 60 and is secured at its left end 64a to an eye 66 in base 10. The right end 64b of chain 64 is attached to one end of an extension spring 68 shown collapsed in FIG. 3. The other end of spring 68 is secured to an eye 70 in base 10.

Fixed to the lower surface of plate 40 is a block 72 that holds a pivot pin 74 on which swings an arm 76. In FIG. 3, the arm portion 76a to the left of the pin 74 is relatively short and is adapted to engage the teeth of bevel gear 52. Arm portion 76b to the right of the pin 74 is relatively long, its weight tending to keep the end of arm portion 76a in engagement with gear 52. A wire cable 78, shown slackened in FIG. 3, has its upper end attached to arm portion 76a and its lower end attached to an eye 80 in base 10.

As shown in FIG. 3, base 10 extends to the left and supports a removable receptacle 82 positioned to receive litter that may overflow from the bowl 48 when it is in position 48'.

The apparatus operates as follows, assuming the parts are in the positions (the at rest position) shown in dashed lines. Each of the trays 22 and 24 is first charged with litter. As shown in FIG. 1, some of this litter will spread over the ledges 22f and 24f. The litter is a natural attraction for an animal such as a cat so that it is encouraged to jump on the platform. Under the weight of the animal, the platform descends to the position designated 20 in FIG. 3, thus moving the plate beneath the platform from position 40' to the horizontal position 40 and tensioning spring 44. At the same time, spring 68 goes from extended to collapsed configuration pulling chain end 64b to the right and, referring to FIG. 3, turning sprocket 60 clockwise. Referring to FIG. 1, this tends to unwrap spring 62. The tension of spring section 62a is so adjusted that it slips around the shaft 56 as spring 68 collapses and therefore rotation of sprocket wheel 60 does not cause rotation of shaft 56, bevel gears 52 and 54 nor the bowl 48. Meanwhile, cable 78 is slackened and the arm portion 76 swings, by gravity forces, into engagement with the teeth of gear 52 to lock it from rotation.

During the elimination process, the animal's body waste falls through the aperture between the trays into the litter in bowl 48. The animal, especially a cat, may paw some of the litter from each tray ledge 22f and 24f, causing it to fall into bowl 48, but the cat may not paw at the elimination contained within the bowl 48. The animal then leaves the platform 20. The weight of the animal now being removed, spring 44 shortens, rotating the parts into the inclined position shown in dashed lines.

Spring 44 is so designed that it exerts enough tension not only to raise all the parts to raised position, but also to overcome the tension of spring 68 and the restraining force of spring 62. Thus, as the bowl rises toward its inclined position, sprocket wheel 60 rotates counterclockwise, causing spring section 62a to wrap tightly around and into driving relationship with shaft 56 and causing section 62b to be coiled more tightly.

As the bowl approaches the angle of repose of the sand or litter, cable 78 tightens, pulling arm section 76a out of engagement with gear 52. Spring section 62b is then free to unwind and will rotate shaft 56 clockwise as seen in FIG. 3 which in turn will rotate pinion 54, gear 52 and bowl 48. Rotation of bowl 48 disperses and absorbs the body waste in the litter in bowl 48. The apparatus has now returned to its starting position, ready for another operation cycle with the waste material being fully dispersed throughout the sand or litter. By providing the pawl 55 and ratchet 53, back rotation of the bowl is prevented.

Repeated use of the apparatus by the animal will eventually result in an excess of litter and body waste accumulating in bowl 48 which will overflow when the bowl is tilted and rotated as in position 48'. The overflow is collected in the removable receptacle 82.

Figure 4:
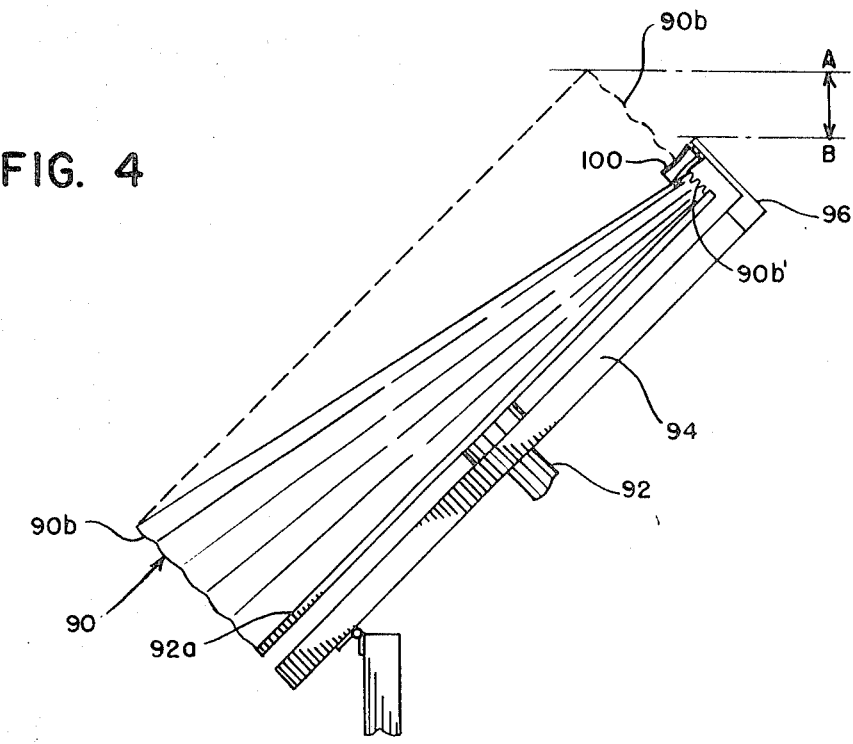
FIGS. 4 and 4A show in horizontal and in tilted positions, an optional construction of a litter bowl used in the apparatus.
Figure 4A:
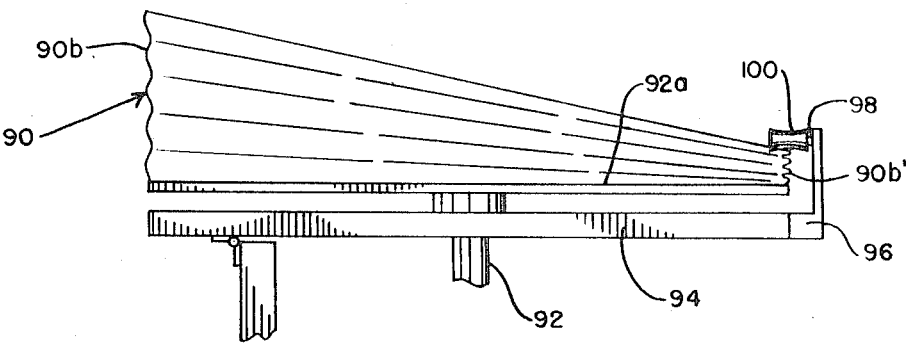

An optional construction is illustrated in FIG. 4 in which a bowl 90 is supported on a shaft 92 turning in plate 94. Bowl 90 has a rigid bottom 90a supporting a resilient collapsible side wall 90b. Side wall 90b may be made of an elastomer or may use a construction similar to the common flexible ducting in which the wall comprise a coil spring embedded in an elastomer.

Plate 94 extends beyond and to the right of the bowl 90 and carries a bracket 96 to which is fixed a shaft 98 carrying a roller 100. Roller 100 bears on and compresses the side 10b' of bowl 90. Thus, bowl 90 is free to rotate while portions of the side wall are successively compressed as they pass under roller 100.

In FIG. 3, the platform 20 must be located at such a height that it clears the topmost point 48" of the bowl 48 when the bowl 48 is tilted upward. It will be seen that the construction of FIG. 4 can shorten the vertical distance from the base to the topmost point of the bowl because the compression of the bowl side 90b as it rotates against 100 lowers this required height by the distance A–B. Thus, the construction of FIG. 4 may substantially reduce the overall height of the apparatus. If desired, roller 100 and its supporting shaft and bracket may be omitted. The right side 90b' of bowl 90 would then rub on the bottom of platform 20. This would also achieve the desired reduction in overall height of the apparatus.

The litter trays 22 and 24 and the overflow receptacle 82, while sometimes desirable, are not necessary. This may be dispensed with in a simplified construction and sand or litter may be added manually from time to time as will be the case in any event.

Figure 5:
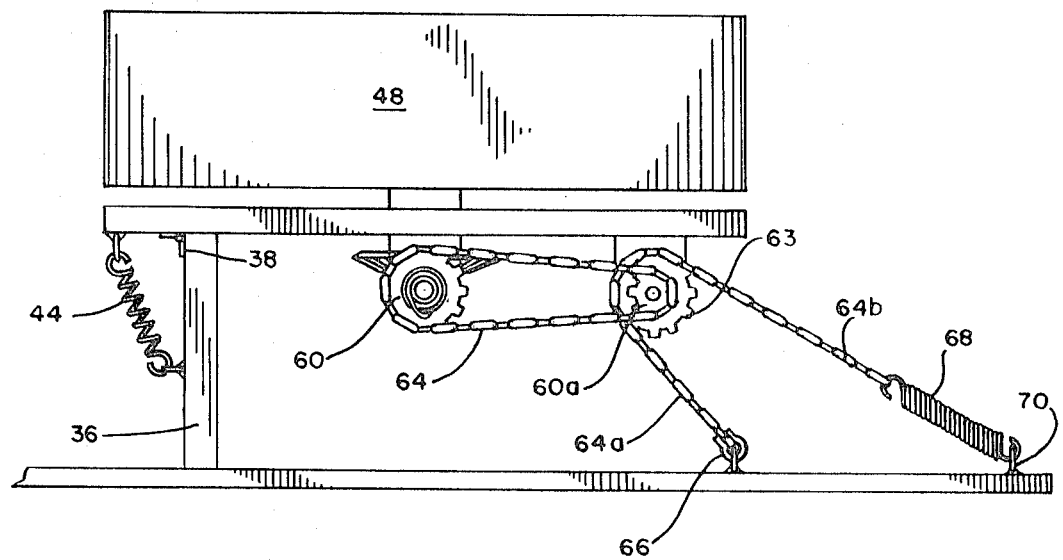
FIG. 5 is a partial view, in right side elevation, showing details of a modification of this invention.

FIG. 5 illustrates a modification of the bowl driving mechanism of this invention. In this construction, the gear 60 is driven by chain 64, which, in turn, is driven by sprocket 60a. Sprockets 60a is fixedly positioned along with sprockets 63 on a rotatable shaft so that they will rotate together. Sprocket 63 is associated with chains 64a–64b and spring 68.

The advantage of this arrangement is that it permits selecting a preferred distance through which spring 68 will be caused to move in a cycle of operation and, accordingly, the strength of the spring. First, it can be seen that this arrangement permits sprocket 60a to be positioned at any given distance from the hinge 38. If the sprocket 60a is moved closer to the hinge, the extension of spring 68 will be less in a cycle of operation than in the case where the sprocket 69a is located further away from the hinge. In the former instance, a higher strength spring must be used in order to store the necessary driving force than is required in the latter instance. Second, the arrangement shown in FIG. 5 permits variations in the diameters of sprocket 60a and sprocket 63. This enables selection of any desired mechanical advantage to the driving mechanism.

If desired, a number of additions may be made to the construction described. The bowl 48 and overflow receptacle 82 may require occasional cleaning. To make this task easier, an insert in the form of a plastic film bag may be placed in the bowl and receptacle. The wall of the insert may be made long enough so that the top portion of the wall may be turned down over the outside of the bowl and receptacle walls and held engaged by a coil spring encircling the upper portion of the outside walls.

The overflow receptacle 82 may be equipped with a device to indicate when it requires emptying. To this end, the receptacle may be mounted on a platform, which platform may tilt under the weight of the loaded receptacle to cause a signal flag to be erected or to trip a micro-switch to light an indicator bulb.

An optional overflow receptacle construction may be incorporated using a circular tray with mechanism connecting it to the tiltable plate 40 so that the receptacle turns through part of a circle each time the apparatus is used, thus distributing the contents uniformly in the receptacle.

The above description of this device is based upon a self-contained mechanical drive mechanism that utilizes the weight of the pet to cause tilting and rotation of the bowl. This type of arrangement is advantageous because the device is completely portable and does not require servicing. However, other embodiments will readily suggest themselves to one skilled in the art and it is intended that these alternative embodiments be included within the scope of the invention as claimed and described. For example, instead of a mechanical driving means, an electro-mechanical system could readily be substituted therefor. In such system, the weight of the pet on the platform would depress a microswitch that in turn would energize a small electric motor. When the pet jumps off the platform, the motor would cause the tray to rotate for a brief timed interval until the necessary mixing was accomplished. In such an electromechanical system, either battery power or household current could be used, as might be convenient.

I claim:

1. Apparatus for receiving the body waste of an animal and dispersing the body waste in absorbent material, comprising:
   a base;
   a platform positioned above the base adapted to support the animal, which platform:
       is mounted for vertical reciprocating motion with relationship to the base, and
       has a central aperture adapted to receive the downward passage of the body waste;
   a bowl mounted intermediate the platform and the base, which bowl:
       is mounted for a first rotational motion adjacent one of its sides around a horizontally disposed axis, and
       is mounted for a secondary rotational motion around the principal axis of the bowl;
   means linking the reciprocating motion of the platform with the first rotational motion of the bowl;
   first spring means to bias the platform in its extended upper position;
   second spring means to store energy when the platform is moved from its extended upper position to a lower position;
   means to utilize stored energy in the second spring to actuate the second rotational motion of the bowl; and
   control means to permit storage of energy in the second spring means while the platform is being lowered against the bias of the first spring means and to release the stored energy and cause the second rotational motion of the bowl when the platform is being elevated by the bias of the first spring means.

2. Apparatus according to claim 1 wherein the vertical downward motion of the platform against the bias of the first spring is induced by the weight of an animal standing on the platform.

3. Apparatus according to claim 1 wherein a removable receptable is positioned on the base beneath the lip of the bowl so as to receive contaminated litter that may overflow from the bowl.

4. Apparatus according to claim 1 wherein the bowl has a rigid bottom and upstanding side walls, the side walls being yieldable so that when the bowl is in a tilted position, the uppermost portion of the side wall may be compressed.

References Cited

UNITED STATES PATENTS 3,316,880  5/1967  Jungles _____ 119—1
3,482,546  12/1969 Anderson _____ 119—1

ALDRICH F. MEDBERY, Primary Examiner

U.S. Cl. X.R.

119—29